(12) United States Patent
Atkinson et al.

(10) Patent No.: US 7,607,358 B2
(45) Date of Patent: Oct. 27, 2009

(54) FLOW RATE DETERMINATION OF A GAS-LIQUID FLUID MIXTURE

(75) Inventors: Ian Atkinson, Ely (GB); Miriam Archer, Marlow (GB)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 12/048,873

(22) Filed: Mar. 14, 2008

(65) Prior Publication Data

US 2009/0229375 A1    Sep. 17, 2009

(51) Int. Cl.
*G01F 1/58* (2006.01)
(52) U.S. Cl. .................................... 73/861.12
(58) Field of Classification Search .............. 73/861.31, 73/861.27, 861.04, 861.52
See application file for complete search history.

(56) References Cited

U.S. PATENT DOCUMENTS

| | | | |
|---|---|---|---|
| 3,938,738 A * | 2/1976 | Nagel et al. | 239/9 |
| 4,044,943 A * | 8/1977 | Brown et al. | 494/6 |
| 4,232,549 A | 11/1980 | Migrin et al. | |
| 4,282,751 A | 8/1981 | Brown et al. | |
| 4,312,234 A | 1/1982 | Rhodes et al. | |
| 4,467,659 A | 8/1984 | Baumoel | |
| 5,007,293 A * | 4/1991 | Jung | 73/861.04 |
| 5,203,211 A * | 4/1993 | Jung | 73/861.04 |
| 5,251,490 A | 10/1993 | Kronberg | |
| 5,287,752 A * | 2/1994 | Den Boer | 73/861.04 |
| 5,396,807 A | 3/1995 | Dowty et al. | |
| 5,400,657 A | 3/1995 | Kolpak et al. | |
| 5,463,906 A | 11/1995 | Spani et al. | |
| 5,501,099 A | 3/1996 | Whorff | |
| 5,591,922 A | 1/1997 | Segeral et al. | |
| 5,654,502 A * | 8/1997 | Dutton | 73/152.18 |
| 5,693,891 A | 12/1997 | Brown et al. | |
| 5,719,329 A | 2/1998 | Jepson et al. | |
| 5,793,216 A | 8/1998 | Constant | |

(Continued)

FOREIGN PATENT DOCUMENTS

EP    0076882 A1    4/1983

(Continued)

OTHER PUBLICATIONS

Atkinson et al: "New generation multiphase flowmeters from Schlumberger and Framo Engineering AS", 17th International North Sea Flow Measurement Workshop, Oslo, Norway, Oct. 25-28, 1999.

(Continued)

*Primary Examiner*—Jewel Thompson
(74) *Attorney, Agent, or Firm*—James McAleenan; Jody Lynn DeStefanis; Dale Gaudier

(57) ABSTRACT

Methods and systems are described for determining a flow rate of a gas-liquid fluid mixture in a conduit. In the described systems and methods, the fluid mixture is conditioned so that the liquid in the mixture is separated from the gas in the mixture. Properties of the conditioned flow may then be measured to determine the flow rate. In an embodiment of the invention, the hold up of the separated liquid is measured; the velocity of the separated liquid is measured; the velocity of the separated gas is measured; and the flow rate of the gas-liquid fluid mixture is determined from the hold up and the velocities.

21 Claims, 7 Drawing Sheets

U.S. PATENT DOCUMENTS

| | | | |
|---|---|---|---|
| 5,905,208 | A | 5/1999 | Ortiz et al. |
| 6,058,787 | A | 5/2000 | Hughes |
| 6,284,023 | B1 * | 9/2001 | Torkildsen et al. ............ 95/216 |
| 6,575,043 | B1 | 6/2003 | Huang et al. |
| 6,622,574 | B2 | 9/2003 | Fincke |
| 6,719,048 | B1 * | 4/2004 | Ramos et al. .......... 166/250.15 |
| 6,758,100 | B2 | 7/2004 | Huang |
| 6,831,470 | B2 | 12/2004 | Xie et al. |
| 7,327,146 | B2 | 2/2008 | Simon |
| 7,454,981 | B2 * | 11/2008 | Gysling ................... 73/861.31 |
| 2007/0157737 | A1 | 7/2007 | Gysling et al. |
| 2008/0163700 | A1 | 7/2008 | Huang |
| 2008/0223146 | A1 | 9/2008 | Atkinson et al. |
| 2008/0319685 | A1 | 12/2008 | Xie et al. |
| 2009/0114038 | A1 | 5/2009 | Atkinson et al. |

FOREIGN PATENT DOCUMENTS

| | | |
|---|---|---|
| GB | 2152213 A | 7/1985 |
| GB | 2177803 A | 1/1987 |
| GB | 2238615 A | 6/1991 |
| GB | 2279146 A | 12/1994 |
| GB | 2300265 A1 | 10/1996 |
| GB | 2343249 A | 5/2000 |
| GB | 2343249 B | 1/2001 |
| GB | 2363455 A | 12/2001 |
| GB | 2359435 B | 5/2002 |
| GB | 2363455 B | 10/2002 |
| GB | 2376074 A | 12/2002 |
| GB | 2406386 A | 3/2005 |
| GB | 2420299 A | 5/2006 |
| GB | 2447490 A | 9/2008 |
| GB | 2454256 A | 5/2009 |
| WO | 8902066 A1 | 3/1989 |
| WO | 9108444 A1 | 6/1991 |
| WO | 95/33980 A1 | 12/1995 |
| WO | 9724585 A1 | 7/1997 |
| WO | 00/03207 A1 | 1/2000 |
| WO | 0123845 A1 | 4/2001 |
| WO | 2004106861 A2 | 12/2004 |
| WO | 2005031311 A1 | 4/2005 |
| WO | 2005040732 A1 | 5/2005 |
| WO | 2007105961 A1 | 9/2007 |
| WO | 2007129897 A1 | 11/2007 |
| WO | 2008029025 A1 | 3/2008 |
| WO | 2008084182 A1 | 7/2008 |
| WO | 2008110805 A1 | 9/2008 |
| WO | 2009037434 A1 | 3/2009 |
| WO | 2009037435 A2 | 3/2009 |
| WO | 2009056841 A1 | 5/2009 |

OTHER PUBLICATIONS

Batchelor: "Steady axisymmetric flow with swirl", An Introduction to Fluid Dynamics, Cambridge University Press, 2000, section 7.5, pp. 543-555.

Clark: "Liquid film thickness measurement", Multiphase Science and Technology, vol. 14, No. 1, 2002, pp. 1-74.

Constant et al: "Multiphase metering using ultrasonics as an alternative approach", Documentation of Multiphase Metering Conference, Mar. 12-13, 1997, The Airport Skean Hotel, Aberdeen, Organised by ISC Technical Services Ltd.

Falcone et al: "ANUMET—a novel wet gas flowmeter", SPE Annual Technical Conference and Exhibition, Denver, Colorado, Oct. 5-8, 2003, SPE 84504.

Folgerø et al: "Permittivity measurement of thin liquid layers using open-ended coaxial probes", Measurement Science and Technology, vol. 7, 1996, pp. 1164-1173.

Gibson et al: "Keynote paper—Swirling flow through Venturi tubes of convergent angle 10.5° and 21°", Proceedings of FEDSM2006, 2006 ASME Joint U.S.—European Fluids Engineering Summer Meeting, Miami, Florida, Jul. 17-20, 2006, FEDSM2006-98229.

Greenwood et al: "Self-calibrating sensor for measuring density through stainless pipeline wall", Journal of Fluids Engineering, vol. 126, 2004, pp. 189-192.

Gudmundsson et al: "Gas-liquid metering using pressure-pulse technology", SPE Annual Technical Conference and Exhibition, Houston, Texas, Oct. 3-6, 1999, SPE 56584.

Gunarathne et al: "Novel techniques for monitoring and enhancing dissolution of mineral deposits in petroleum pipelines", Offshore Europe Conference, Aberdeen, Sep. 5-8, 1995, SPE 30418.

Hammer: "Flow permittivity models and their application in multiphase meters", Proceedings of Multiphase Metering, IBC Technical Services, Aberdeen Mar. 12-13, 1997.

Hayman et al: "High-resolution cementation and corrosion imaging by ultrasound", SPWLA 32nd Annual Logging Symposium, Midland, TX, USA, Jun. 16-19, 1991, paper KK.

Lynnworth: "Level of liquids and solids", Ultrasonic measurements for process control. Theory, techniques, applications, Academic Press, 1989, chapter 2, section 2.4.3, pp. 58-63.

Lynnworth: "Ultrasonic measurements for process control. Theory, techniques, applications", Academic Press, 1989, pp. 23-27, 30, 32-35, 254-255, 312-317.

Takeda: "Velocity profile measurement by ultrasound Doppler shift method", Int. J. Heat & Fluid Flow, vol. 7, No. 4, 1986, pp. 313-318.

Theron et al: "Stratified flow model and interpretation in horizontal wells", SPE Annual Technical Conference and Exhibition, Denver, Colorado, Oct. 6-9, 1996, SPE 36560.

Willemetz et al: "Instantaneous Doppler frequency measurement and implementation in a multigate flowmeter", EUROSON 87, Helsinki, Finland, Jun. 14-18, 1987.

Xie: "Measurement of multiphase flow water fraction and water-cut", American Institute of Physics Conference Proceedings, Jun. 5, 2007, vol. 914, pp. 232-239. Proc. 5th Int. Symp. on Measurement Techniques for Multiphase Flows (5th ISMTMF), Dec. 11-14, 2006, Macau, China.

Bondet De La Bernardie et al. "Low (10-800 MHz) and high (40 GHz) frequency probes applied to petroleum multiphase flow characterization", Measurement Science and Technology, vol. 19, 2008, pp. 1-8.

Fryer et al., "The effect of swirl on the liquid distribution in annular two-phase flow" International Journal of Multiphase Flow, vol. 8, 1982, pp. 285-289.

* cited by examiner

FLOW RATE DETERMINATION OF A GAS-LIQUID FLUID MIXTURE

FIELD OF THE INVENTION

The present invention relates to a method of measuring the flow rate of a gas-liquid fluid mixture.

BACKGROUND OF THE INVENTION

The determination of gas and liquid flow rates in gas-liquid fluid mixtures is important in the oil and gas industry.

An example of an apparatus for measuring such flow rates is Schlumberger's Vx™ system (see e.g. I. Atkinson, M. Berard, B.-V. Hanssen, G. Ségéral, $17^{th}$ International North Sea Flow Measurement Workshop, Oslo, Norway 25-28 Oct. 1999 "New Generation Multiphase Flowmeters from Schlumberger and Framo Engineering AS") which comprises a vertically mounted Venturi flow meter, a dual energy gamma-ray hold up measuring device and associated processors. This system allows the simultaneous calculation of gas, water and oil volumetric flow rates in multi phase flows.

Although providing proven performance, the Vx™ system and other conventional multiphase flow meters are relatively expensive, which tends to preclude their application in "brown" field sites (i.e. oil and gas wells where capacity has fallen below about 1000 barrels/day (0.0018 $m^3$/sec)) and other low hydrocarbon producers. However, such sites probably account for around 2-3 million oil and gas wells worldwide.

SUMMARY OF THE INVENTION

Thus there is a need for a relatively inexpensive flow meter that nonetheless has sufficient linearity and repeatability over a range of gas volume fractions (GVFs). For example, the GVF in flow from "brown" field sites can vary from about 15 to about 95%.

In general terms, the present invention provides a method and a corresponding apparatus for determining a flow rate of a fluid, such as a gas-liquid fluid mixture In a first aspect, the present invention provides a method for determining a flow rate of a gas-liquid fluid mixture including the steps of:

providing a conduit through which the gas-liquid fluid mixture flows;

conditioning the fluid mixture in the conduit to separate the liquid in the mixture from the gas;

measuring the hold up of the separated liquid;

measuring the velocity of the separated liquid;

measuring the velocity of the separated gas; and determining the flow rate of the gas-liquid fluid mixture from the hold up and the velocities.

Typically, and conveniently, the measurements can be made on the same conduit transverse cross-section. However, if the conditioned flow is sufficiently stable, the measurements can be spaced along the conduit Unlike the Vx™ system, which requires gamma-ray-determined hold ups to calculate flow rates, the method for measuring a flow rate can use relatively inexpensive technology, such as ultrasound, to measure the hold up and the liquid velocity. A further advantage relative to the Vx™ system is that health and safety issues pertaining to the use of gamma-ray sources can be avoided.

Advantageously, the conduit does not need to be horizontal. Indeed, the approach is independent of conduit orientation. Further, the approach is highly scalable, and can be applied to flow through conduits of widely varying diameter.

Preferably, the liquid is separated from the gas by swirling the flow in the conduit to form a liquid annulus around a gas core. For example, the conduit may have a swirl element, such as a helical insert or vane assembly, for inducing the mixture to exhibit swirling flow. The swirl element may include one or more spiral-shaped members extending along the conduit in the direction of fluid flow. Preferably, the spiral shaped members are positioned at the wall of the conduit and, when viewed along the axis the conduit, leave a central core of the conduit unimpeded (i.e. they do not extend radially inwards as far as the central axis of the conduit). Alternatively, the swirl element may be formed by a tangential flow inlet to the conduit.

An advantage of swirling flow is that it is relatively easy to induce and sustain, and is symmetrical about the flow axis. However, alternatively, the flow can be conditioned to exhibit stratified flow to separate the liquid from the gas.

When swirling flow is adopted, preferably the hold up is measured by determining the thickness of the liquid annulus.

Preferably the position of an interface between the separated liquid and the separated gas is determined to measure the hold up. For example, as indicated above, the position of the interface can be determined ultrasonically. Additionally (or indeed alternatively), the velocity of the separated liquid can be measured ultrasonically.

Preferably, the dynamic pressure of the separated gas is determined to measure the velocity of the separated gas. For example, the dynamic pressure can be determined using a Pitot tube. This can be a low cost and robust approach that may be applied to a large operating range of flow velocities. However, alternatively, the velocity of the separated gas can be measured using e.g. a vortex shedder or an insertion turbine meter.

Preferably, the static pressure of the separated gas and/or the temperature of the separated gas are also measured. These measurements allow the flow rate to be converted to standard conditions. Advantageously, a Pitot tube device can measure the static pressure at the same time as dynamic pressure. Further, such a device can easily incorporate a thermometer.

To compensate for irregularities in the flow and to reduce the effect of noise in the measurements, the hold up and velocity measurements may be time-averaged.

The liquid of the mixture may comprise oil and/or water. The gas may comprise natural gas. Thus the gas-liquid fluid mixture may be a mixture of natural gas, condensate and optionally water.

A second aspect of the present invention provides an apparatus for providing measurements useable in determining a flow rate of a gas-liquid fluid mixture, the apparatus including:

a conduit through which the gas-liquid fluid mixture can flow, in use the fluid mixture in the conduit being conditioned to separate the liquid in the mixture from the gas;

a device for measuring the hold up of the separated liquid;

a device for measuring the velocity of the separated liquid; and a device for measuring the velocity of the separated gas;

wherein the hold up and the velocities are usable to determine a flow rate of the gas-liquid fluid mixture.

The apparatus can be used in the performance of the method of the first aspect. Optional features of the first aspect may therefore be applied, singly or in combination, to the second aspect.

Thus the apparatus may further include a swirl element for conditioning the fluid by swirling the flow in the conduit to form a liquid annulus around a gas core. The hold up measuring device can then determine the thickness of the liquid annulus to measure the hold up. However, more generally, the hold up measuring device may determine the position of an interface between the separated liquid and the separated gas to measure the hold up.

The hold up measuring device may determine the position of the interface ultrasonically. Additionally (or alternatively) the liquid velocity measuring device may measure the velocity of the separated liquid ultrasonically. Preferably, the hold up measuring device and the liquid velocity measuring device are combined in one ultrasonic measuring device.

Preferably, the gas velocity measuring device determines the dynamic pressure of the separated gas to measure the velocity of the separated gas. For example, the gas velocity measuring device can include a Pitot tube device to determine the dynamic pressure. Preferably, the static pressure of the separated gas and/or the temperature of the separated gas are also measured by suitable devices. For example, the static pressure can be measured by the Pitot tube device, and the temperature by a thermometer provided alongside the Pitot tube device.

Advantageously, the apparatus can have no moving parts.

The devices may measure a time-averaged hold up and time-averaged velocities.

A third aspect of the present invention provides a flow meter for determining a flow rate of a gas-liquid fluid mixture, the flow meter including:

the apparatus of the second aspect; and a processor arranged to determine the flow rate of the gas-liquid fluid mixture using the hold up and the velocities measured by the apparatus.

The processor may calculate a time-averaged hold up and time-averaged velocities from sequences of respective measurements.

A further aspect of the present invention provides an oil well pipeline or a gas well pipeline including an apparatus according to the second aspect or a meter according to the third aspect.

A further aspect of the present invention provides an apparatus according to the second aspect when conveying a gas-liquid fluid mixture, or a meter according to the third aspect when conveying a gas-liquid fluid mixture.

BRIEF DESCRIPTION OF THE DRAWINGS

Embodiments of the invention will now be described by way of example with reference to the accompanying drawings, in which.

DETAILED DESCRIPTION

Figure 1:
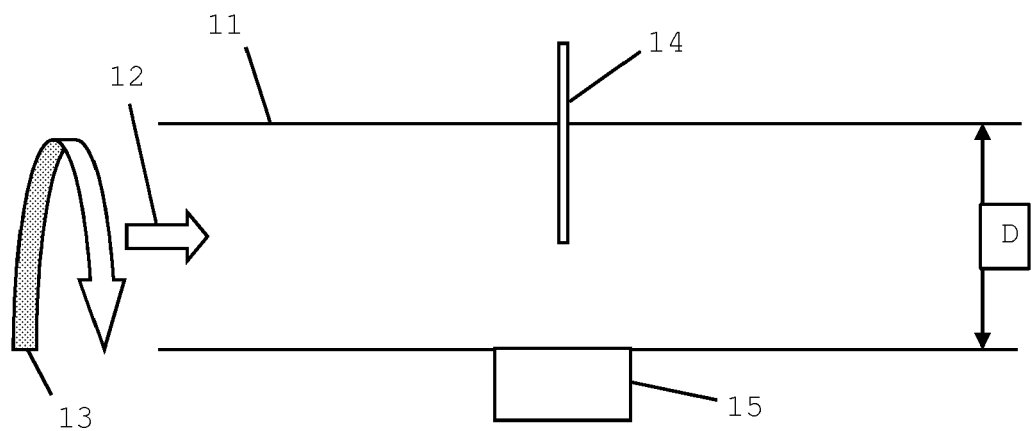
FIG. 1 shows schematically a longitudinal section through an apparatus for providing measurements useable in determining a flow rate of a gas-liquid fluid mixture.

FIG. 1 shows schematically a longitudinal section through an embodiment of an apparatus for providing measurements useable in determining a flow rate of a gas-liquid fluid mixture.

Figure 2:
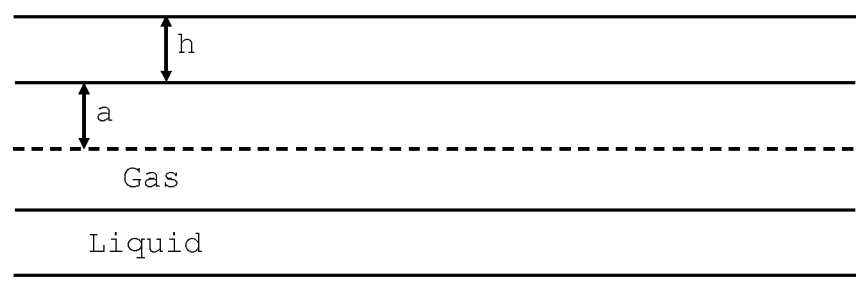
FIG. 2 shows schematically the separation of the liquid and gas in the conduit of the apparatus of FIG. 1.

The apparatus comprises a conduit 11 of circular cross-section and diameter D. A gas-liquid fluid mixture flows through the conduit in the direction indicated by arrow 12. A swirl element (not shown), such as a helical insert in the conduit or a tangential flow inlet to the conduit, induces the mixture to exhibit swirling flow as indicated by arrow 13. An effect of this swirling flow is that liquid from the mixture is displaced to the wall of the conduit to form a liquid annulus around a gas core of radius a, as shown schematically in FIG. 2.

Returning to FIG. 1, the apparatus has a Pitot tube device 14 of known type which measures the dynamic pressure, $\Delta P$, of the gas at the centre of the conduit (for example by measuring the difference between the stagnation and static pressures at that position). The device 14 also includes a thermometer which measures the gas temperature at the centre of the conduit.

Opposite the Pitot tube device 14, a clamp-on ultrasonic measuring device 15 measures the position of the interface between the liquid annulus and the gas core. The device 15 also measures the velocity profile of the liquid across the thickness of the annulus. Possible configurations for device 15 are described in the Appendix. Although the ultrasonic measuring device 15 is shown in FIG. 1 opposite the Pitot tube device 14, the stability of the swirling flow may allow the devices to be spaced relative to each other along the conduit. For example, a spacing of up to two conduit diameters may be acceptable.

The ultrasonic measuring device 15 provides the liquid velocity, v(t), as a function of liquid depth, t, and the liquid holdup by measuring the liquid layer thickness, h. The total liquid volumetric flow rate, $q_L$, in the conduit is thus given by:

$$q_L = \int_{D/2-h}^{D/2} v(t) 2\pi t \, dt. \qquad \text{Eq. I}$$

It remains then to determine the gas volumetric flow rate, $q_G$.

Assuming a flat gas velocity profile, $q_G$ is given by:

$$q_G = \pi \left(\frac{D}{2} - h\right)^2 v_G. \qquad \text{Eq. II}$$

where $v_G$ is the gas velocity.

$v_G$ is related the Pitot tube dynamic pressure measurement, ΔP, by the relation:

$$\Delta P = k\rho_G v_G^2 \qquad \text{Eq.III}$$

where $\rho_G$ is the gas density, and k is a calibration factor which varies as a function of the Reynolds number, Re ($=\rho_G v_G a/\mu_G$, $\mu_G$ being the gas viscosity), of the gas in the core.

Figure 3:
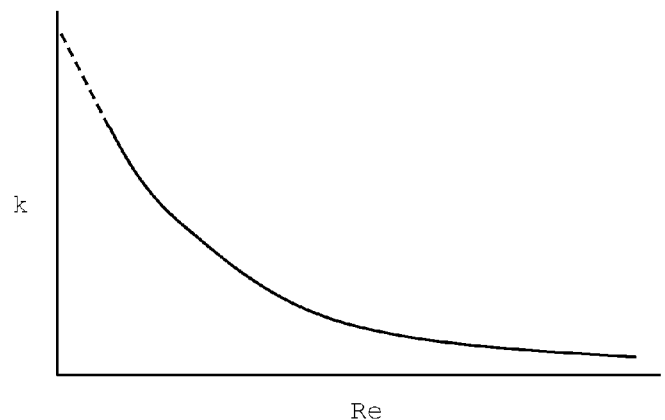
FIG. 3 shows schematically the relation between a calibration factor, k, and Reynolds number, Re.

The relation between k and Re can be shown experimentally to take the form shown schematically with a solid line in FIG. 3. Having determined this relation, k can be obtained for a particular ΔP by iteration. For example, an initial value for k can be taken as the intersection of the extrapolation (shown with a dashed line in FIG. 3) of the experimentally determined k versus Re curve with Re=0. This allows an initial value for $v_G$ to be determined from Eq.III, which value can then be used to determine a corresponding value for Re (the temperature measured by the thermometer of the Pitot tube device 14 allowing accurate values for the temperature-dependent quantities $\rho_G$ and $\rho_G$ to be employed, and the gas core radius, a, being determined from D–h, where h is measured by the ultrasonic measuring device 15). The corresponding value for Re can then be used to update the initial value for k using the experimentally determined k versus Re curve. Convergence on a stable value for k typically occurs in about four iterations.

Then, using the value for k, $v_G$ determined from Eq.III provides $q_G$ from Eq.II, and the total flow rate $q_L+q_G$ from Eq.I and Eq.II. The temperature and static pressure measurements by device 14 allow these flow rates to be converted to standard conditions, if needed.

Thus, by connecting the outputs of the Pitot tube device 14 and the ultrasonic measuring device 15 to a processor (not shown) which is suitably configured for performing the above analysis, flow meter readings for the liquid, gas and/or the total flow rate can be obtained.

Although the analysis uses the axial gas velocity, rather than the tangential gas velocity or a combination of the axial and tangential velocities, in Re, the analysis is still valid. This is because the ratio of the axial to the tangential gas velocity is fixed and determined by a constant ratio between cross-sectional areas of the swirl element (e.g. the ratio between the cross-sectional area of a tangential flow inlet and the cross-sectional area of the conduit, or the ratio between the proportion of the conduit cross-section affected by a helical insert and the proportion of the conduit cross-section which is unaffected).

Also the effect of the swirl on the dynamic pressure measurement does not significantly alter the analysis. In particular, the difference, due to swirl, between the gas pressure, $P_0$, at a point on the centre line of the conduit and the gas pressure, $P_a$, at a point on the gas-liquid interface is:

$$P_a - P_0 = k\rho_G(a\Omega_G) \qquad \text{Eq.IV}$$

where $\Omega_G$ is the angular velocity of the gas. For typical line pressures and dimensions, it can be shown that the value of $k\rho_G(a\Omega_G)^2$ is not a significant factor.

The conduit does not need to be horizontal, and the approach is highly scalable, allowing it to be applied to flow through conduits of different diameter. In particular, the approach should be applicable to fluid mixtures flowing through standard full bore (i.e. 2 inch/5.1 cm internal diameter) piping.

The measurements can be averaged over time to account for irregularities in the flow, and to reduce the effect of noise on individual measurements.

Other techniques could be used to obtain the liquid annulus thickness, and the liquid and gas velocities, but most of these have drawbacks relative to the ultrasound-Pitot tube approach. For example, γ-rays could be used to determine the liquid annulus thickness, but γ-ray equipment is expensive and has health and safety implications. A vortex shedder or an insertion turbine meter could be used instead of a Pitot tube to measure the gas velocity, but such devices tend to be more intrusive than Pitot tubes. Also, if conversion to standard conditions is needed, it would still be necessary to incorporate temperature and static pressure measurements.

The above embodiment has been described in relation to a fluid mixture conditioned to exhibit swirling flow. Other conditioned flows can be envisaged, however. For example, the liquid and the gas could be conditioned to exhibit stratified flow. Ultrasound could again be used to determine the liquid holdup and liquid velocity, and a Pitot tube device could be used to determine the gas velocity. A possible difficulty, however, would be correctly positioning the Pitot tube in the gas portion of the flow. For example, if the GVF is very low, it may be difficult to position the Pitot tube in the gas. Conversely, if the GVF is very high, it may necessary to take pressure readings measurements across the thickness of the gas layer in order to properly characterise the gas velocity in that layer.

When the fluid mixture is conditioned to exhibit swirling flow, an option is to include a constriction region, such as a Venturi, in the conduit, and to take the measurements at this region. At the constriction region, conservation of angular momentum can increase the swirl velocity and lead to a better separation of liquid and gas. However, as the thickness of the liquid layer would be reduced in the constriction region, care may have to be taken that the resolution of the device or devices for measuring the hold up of the separated liquid and the velocity of the separated liquid is sufficient.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

APPENDIX

Figure 4:
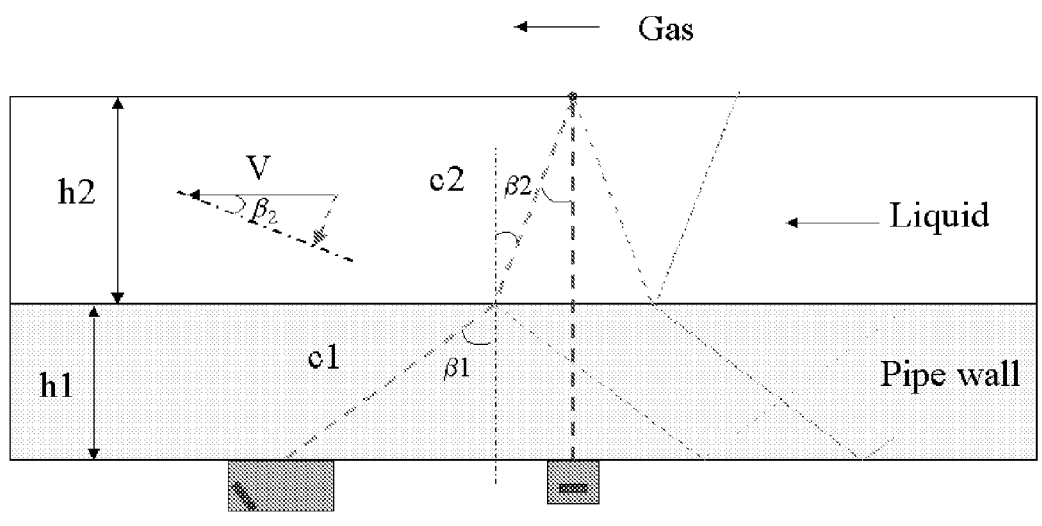
FIG. 4 shows schematically a clamp-on ultrasonic measuring device based on a combination of two ultrasonic pulse-echo measurements with different refraction angles into the liquid layer (TR1 and TR2 can be narrow band transceivers performing range-gated Doppler measurements and flow profiling, or wide-band pulse-echo transceivers measuring arrival times of echoes directly in time-domain)

An example of clamp-on ultrasonic measuring device 5 is shown in FIG. 4 and consists of at least one first ultrasonic transceiver transducer (TR1) that has a first pulse incidence angle with respect to the liquid/pipe-wall interface and at least one second ultrasonic transceiver transducer (TR2) that has a second pulse incidence angle with respect to the liquid/pipe-wall interface; the two incidence angles are significantly different, and preferably the difference should be as large as possible. As an example, the first incidence angle is within the range of 37 to 80°, and the second angle is 0°, i.e. normal-incidence.

Preferably the aforementioned transducers are mounted on the exterior of the flow-carrying pipe, performing non-invasive measurements, although they may also be used in direct contact with the liquid phase in an invasive manner. The transducers work in a pulse-echo mode, in which an ultrasonic pulse with an appropriate frequency spectrum, is emitted into the flow and echoes from various interfaces, such as the liquid/pipe-wall interface and the gas/liquid interface, are recorded for further signal processing. The centre frequency of the pulse spectrum can typically range from 100 kHz to 100

MHz, but preferably from 500 kHz to 10 MHz. An appropriate signal processor records the signals from TR1 and TR2, and calculates the flow related parameters–speed of sound, interface position (and hence holdup), flow velocity, flow rate, acoustic impedance and component mixing ratio (such as WLR).

Assuming a typical pulse-echo measurement process for both TR1 and TR2, the principle for measuring the gas/liquid interface position and the speed of sound can be explained with the help of FIG. 4. In such a process, TR1, in the transmitter mode, launches a pulse with an incidence angle of $\beta_1$ into the pipe wall of thickness $h_1$. The pulse travels at a speed of sound of $c_1$ within $h_1$. At the pipe-wall/liquid interface, the pulse is refracted at an angle of $\beta_2$ into the liquid layer, whose thickness is $h_2$ (between the pipe-wall and the gas/liquid interface). The pulse continues to travel at a speed of sound of $c_2$ in the liquid layer that flows at an average axial velocity of V. When the pulse reaches the gas/liquid interface, which is never smooth while flowing, a part of the pulse energy is reflected backwards, generating a strong echo that propagates along the emission path back to the transducer TR1, which is now in the receiver mode. The time difference between the emission of the pulse and the arrival of the echo at the transducer gives the round trip travel time of the pulse-echo. This time can be expressed as:

$$T_a = T_{0a} + T_1 + T_2 \qquad \text{Eq.1}$$

where $$T_{0a} = \frac{2 \cdot h_1}{c_1 \cdot \cos\beta_1} \qquad \text{Eq. 2}$$

is the round trip travel time of the pulse in the pipe wall plus that inside the transducer, $$T_1 = \frac{h_2/\cos\beta_2}{(c_2 - V \cdot \sin\beta_2)} \qquad \text{Eq. 3}$$

is the out-going pulse travel time from the pipe wall to the gas/liquid interface, and $$T_2 = \frac{h_2/\cos\beta_2}{(c_2 + V \cdot \sin\beta_2)}, \qquad \text{Eq. 4}$$

is the return echo travel time from the interface to the pipe wall. Note that, in FIG. 4, the out-going pulse is effectively against the flow direction and therefore its actual speed of travel is reduced by the flow velocity, and that the return echo travels effectively with the flow and thus the actual travel speed is increased by the flow velocity.

In equation 1, $T_{0a}$ is a constant that can be determined by a calibration measurement. Note that, because of the round trip nature, the effects of V on $T_1$ and $T_2$ tend to compensate each other. The round trip travel time in liquid is:

$$T_1 + T_2 = \frac{h_2/\cos\beta_2}{c_2 - V \cdot \sin\beta_2} + \frac{h_2/\cos\beta_2}{c_2 + V \cdot \sin\beta_2} = \frac{2 \cdot c_2 \cdot h_2/\cos\beta_2}{c_2^2 - (V \cdot \sin\beta_2)^2}. \qquad \text{Eq. 5}$$

Now, for typical oilfield liquid, the value of $c_2$ is typically in the region of 1000 to 1500 m/s, $\beta_2$, as a design parameter, is normally less than 30° and V normally should be less than 20 m/s. Therefore we have $$(V \cdot \sin\beta_2)^2 << c^2. \qquad \text{Eq.6}$$

Using V=20 m/s, $c_2$=1000 m/s, and $\beta_2$=30', we have $(V \cdot \sin\beta_2)^2/c_2^2 = \sim 0.01\%$. The square operation helps to make this ratio very small. It is therefore very reasonable to omit the term related to flow velocity V in equation 5, and equation 1 becomes $$T_a = T_{0a} + \frac{2 \cdot h_2}{c_2 \cdot \cos\beta_2} = T_{0a} + \frac{2 \cdot h_2}{c_2 \cdot \sqrt{1 - (\sin\beta_2)^2}}. \qquad \text{Eq. 7}$$

According to Snell's law of refraction:

$$\sin\beta_2 = \frac{\sin\beta_1}{c_1} \cdot c_2, \qquad \text{Eq. 8}$$

one can rewrite equation 7 into $$T_a = T_{0a} + \frac{2 \cdot h_2}{c_2 \cdot \sqrt{1 - (\gamma \cdot c_2)^2}}, \qquad \text{Eq. 9}$$

where $\gamma = \sin\beta_1/c_1$ is a constant because the speed of sound and the refraction angle in the pipe wall material are known.

Since there are two unknown variables, $h_2$ and $c_2$, in equation 9, one needs another independent measurement and this is provided by transducer TR2.

TR2 performs a pulse-echo measurement similar to that of TR1. However its pulse incidence angle, $\beta_1$, and hence the refraction angle, $\beta_2$, have very different values to those of TR1. To simplify the analysis, one chooses $\beta_1$=0° i.e. normal incidence. Thus the measured round trip pulse-echo travel time is $$T_p = \frac{2 \cdot h_2}{c_2} + T_{0p}, \qquad \text{Eq. 10}$$

where $$T_{0p} = \frac{h_1}{c_1} \qquad \text{Eq. 11}$$

is the round trip travel time in the pipe wall, which is a known constant. Note that in equation 10, the flow velocity effect is absent. This is due to the fact that the pulse travel direction is perpendicular to that of the average flow velocity.

Dividing equation 10 by equation 9 yields $$\frac{T_p - T_{0p}}{T_a - T_{0a}} = \sqrt{1 - (\gamma \cdot c_2)^2} \qquad \text{Eq. 12}$$

Therefore one can derive the average speed of sound in the liquid layer as $$c_2 = \frac{1}{\gamma} \cdot \sqrt{1 - (T_p - T_{0p})^2 / (T_a - T_{0a})^2}, \qquad \text{Eq. 13}$$

where $(T_{p-T0p}) < (T_\alpha - T_{0\alpha})$.

With the knowledge of $c_2$, one can use either equation 10 or equation 9 to obtain the liquid layer thickness $h_2$. The knowledge of $h_2$ will then allow the liquid holdup to be derived.

Obviously the speed of sound measurement is essential for deriving the liquid layer thickness from the transit time based measurements. The knowledge of $c_2$ will also be required for correcting flow velocity measurement made with either the time-of-flight or the Doppler method, which is sensitive to the speed of sound. In addition to these primary applications, one may be able to use the value of $c_2$ to derive other useful parameters under some circumstances. For instance, for a liquid phase consisting of a homogeneous mixture of two components, the speed of sound $c_2$ can be correlated to the mixing ratio, $\alpha$. The method for deriving $\alpha$ from $c_2$ has been described e.g. in Gudmundsson J. S. and Celius H. K, "Gas-Liquid Metering Using Pressure Pulse Technology", paper SPE56584, presented at the 1999 SPE Annual Technical Conference and Exhibition, Houston, 3-6 October. A useful application of this is the water-in-liquid ratio (WLR) measurement, provided that the liquid phase is gas-free and consists only of two components, i.e. oil and water. Note that the gas-free condition is important because the $c_2$ contrast between oil and water is small (1300 m/s versus 1500 m/s) and the presence of a small percentage of un-separated gas bubbles will have an overwhelming effect on $c_2$, making WLR determination difficult.

Since $c_2$ is sensitive to the content of gas in liquid, it may be used to monitor the quality of the liquid/gas separation process.

The setup shown in FIG. 4 will also allow measuring the acoustic impedance of the liquid phase in contact with the pipe wall. Typically the normal incidence transducer, TR2, is used. The emitted pulse from TR2 gets partially reflected at the liquid/pipe-wall interface and at the pipe/transducer interface, generating an echo reverberation inside the pipe wall. The decay rate of this reverberation is a function of the acoustic impedance of the liquid phase. The method of measuring this decay rate and deriving the acoustic impedance has already been described for example in Heyman A., Hutin R. and Wright P., "High resolution cementation and corrosion imaging by ultrasound", SPWLA 32$^{nd}$ Annual Logging Symposium, Jun. 16-19, 1991, and in Greenwood M. S. and Bamberger J. A., "Self-Calibrating Sensor for Measuring Density Through Stainless Steel pipeline Wall", Journal of Fluids Engineering, Vol. 126, pp. 189-192, March 2004. The basic principle will be explained further below. Since the acoustic impedance is expressed by:

$$Z_L = \rho_{mx} \cdot c_{2x} \qquad \text{Eq.14}$$

where $\rho_{mx}$ and $c_{2x}$ are the density and the speed of the sound in the near wall region of the liquid phase. If the liquid mixture is homogeneous everywhere, then $\rho_{mx} = \rho_m$ and $c_{2x} = c_2$. With $c_2$ determined from equation 13, the mixture density $\rho_m$ can be derived from the measured acoustic impedance $Z_L$. The mixture density offers an additional way of deriving the component mixing ratio, such as water liquid ratio, $\alpha_{wlR}$, through equation 15, if the densities of the individual components, such as $\rho_w$ and $\rho_o$, are known.

$$\rho_m = \alpha_{wlR} \cdot \rho_w + (1 - \alpha_{wlR}) \cdot \rho_o \qquad \text{Eq.15}$$

The liquid holdup, derived via the measured thickness of the liquid layer, $h_2$, can be combined with a velocity measurement to produce the flow rate of the liquid phase. The velocity measurement methods will be described in conjunction with some example embodiments.

In one embodiment, the first angled-incidence ultrasonic transceiver, TR1, is a narrow-band transducer that facilitates a pulsed, also known as range-gated, Doppler measurement. The second transducer, TR2, which preferably has a normal-incidence angle to the pipe-wall, can also be a narrow-band one that facilitates a range-gated Doppler measurement. The details of the narrow-band transducer design and the principle of such a Doppler system for flow velocity measurement have been described in GB patent application no. 2363455. Here it is sufficient to say that such a system produces two profiles as its output—a flow velocity versus echo-delay-time profile and a Doppler signal-energy versus echo-delay-time profile. An example sketch of these is shown in FIG. 5.

Figure 5:
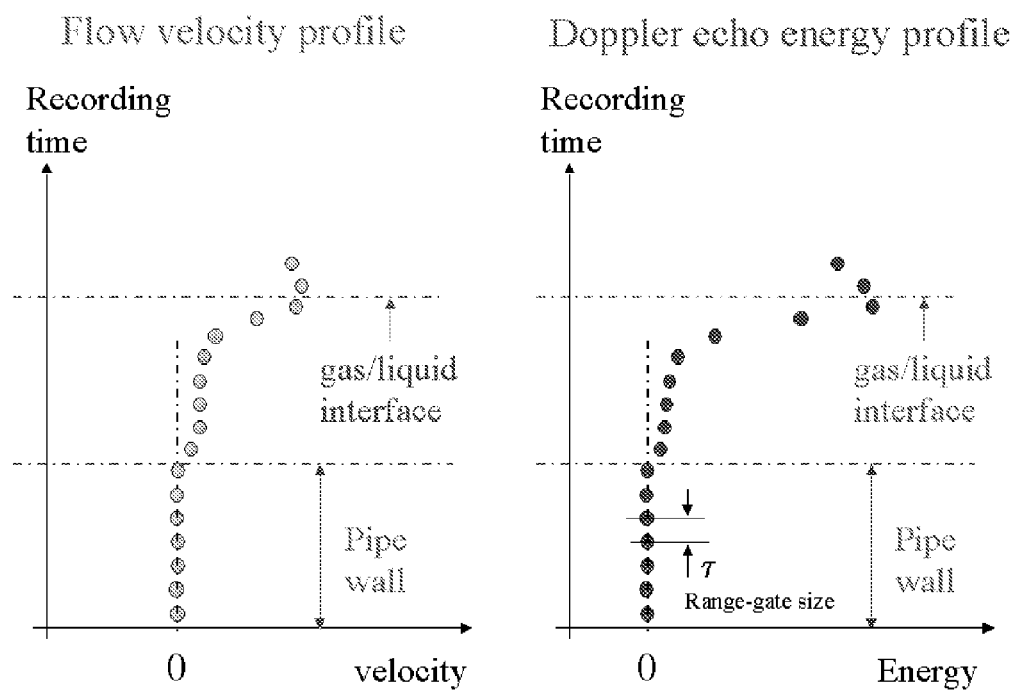
FIG. 5 shows sketches of a flow velocity profile and a Doppler signal energy profile produced by a typical range-gated Doppler measurement system.

The left side of FIG. 5 shows the velocity profile and the right side shows the Doppler energy profile. The time axis represents the delay time between emitting the pulse and arrival of echo signals from a location along the beam path. For the velocity profile, the section with zero velocity value towards the lower part of the profile corresponds to the regions inside the transducer and the pipe-wall, because there are no moving reflectors in these regions to produce the Doppler signal. If there are detectable moving reflectors, such as solid particles, small gas bubbles, liquid droplets (even turbulent eddies if the interrogating frequency is sufficiently high) in the flowing liquid phase, then Doppler signals are generated and a velocity profile across the liquid layer can be generated. It is understandable that the velocity increases significantly towards the interface region because of the drag effect of the gas phase that normally travels faster than the liquid phase.

Similarly for the Doppler energy profile, the zero-valued section corresponds to the regions inside the transducer and inside the pipe wall. In the liquid layer, the flowing reflectors generate certain level of Doppler signal energy. The energy level of each range-gate depends on factors such as the impedance mismatch between the reflectors and the continuous liquid phase, the concentration and size distribution of the reflectors in the corresponding sample volume in the liquid, which determine the scattering cross-section. At the interface, this energy level increases dramatically because of very large reflective surface.

The length of the zero section on the velocity or the energy profile can be measured to identify the liquid/pipe-wall interface and to obtain the constant time $T_{0a}$ in equation 13. The position of the gas/liquid interface is identified from the maxima on the Doppler energy profile or that on the velocity profile. The travel time of the angled incidence pulse in liquid, $T_\alpha - T_{0\alpha}$, is measured by the time difference between this maxima and the wall position on the profile.

Figure 6:
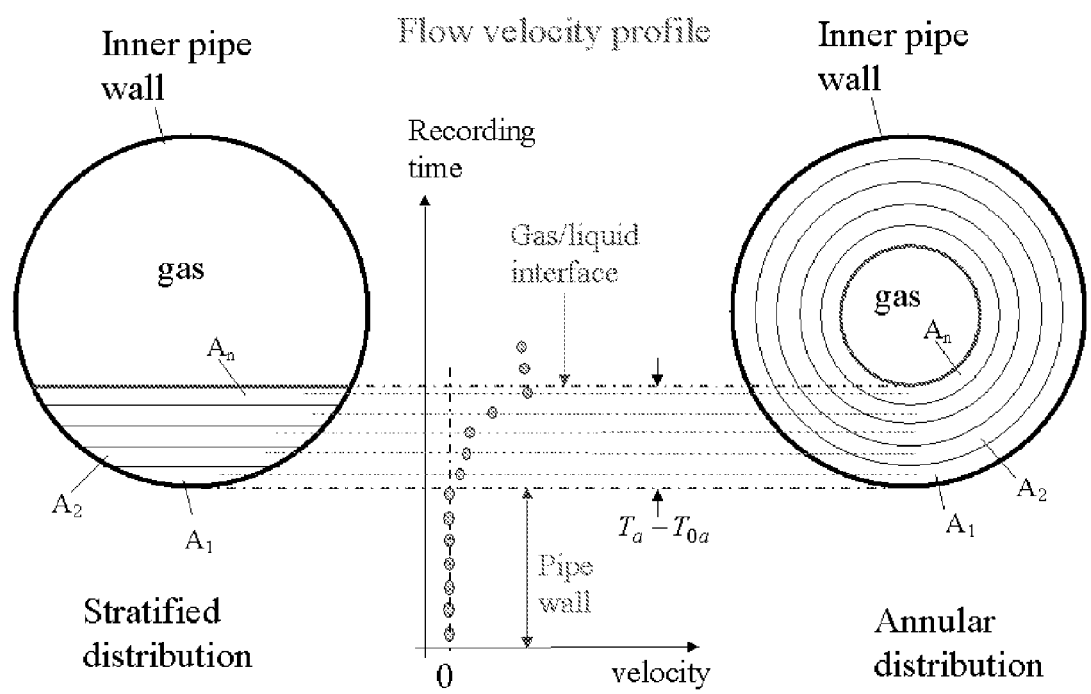
FIG. 6 shows schematically cross-sections with partition of the liquid phase and combination with a velocity profile to produce a spatially averaged liquid flow rate.

To derive the flow rate, each value on the measured velocity profile is multiplied with its representative cross-sectional area to generate a local flow rate value. For a stratified flow, the liquid cross-section is divided into sub-areas by parallel horizontal lines (see FIG. 6, as described in GB patent application number 2363455). For an annular flow, the liquid cross-section is divided into as many concentric annular-shaped regions as the number of non-zero velocity points on the velocity profile, which are within $T_\alpha - T_{0\alpha}$ (see FIG. 6). The flow rate is derived as:

$$Q_L = \sum_{i=1}^{n} A_i \cdot V_i, \qquad \text{Eq. 16}$$

where n is the number of non-zero velocity points within $T_\alpha - T_{0\alpha}$ on the Doppler profile, Ai and Vi are the area and the velocity of the $i^{th}$ region.

Similar to the operation of TR1, TR2 can also be a narrow band transducer and operated to perform range-gated Doppler measurement. The difference is that the incidence angle of TR2 is perpendicular to the pipe-wall. TR2 can use the same emitting frequency as that of TR1, or a different one to that of TR1. The Doppler velocity profile produced by TR2 may not be of much use because the average velocity along the radial direction of the pipe is zero. The Doppler energy profile, on the other hand, should still show non-zero values in the flow region because the reflectors tend to move instantaneously in all the directions. Although the average velocity in the pulse direction is zero, the instantaneous energy value is absolute and will not cancel out. At least, at the fluctuating gas/liquid interface, there will be significant Doppler signal energies generated. Therefore the method of identifying the interface through the energy maxima still applies to the normal incidence measurement. This allows the travel time $T_p$ in equation 13 to be determined. The constant travel time in pipe-wall, $T_{0p}$, can be determined in several ways. For example, as a preferred method, the echoes at the original emission frequency (non-Doppler echoes) can be examined and the echo time corresponding to the pipe-wall/liquid interface can be measured. In this way, TR2 performs a simple time-domain pulse-echo measurement in addition to range-gated Doppler measurement at the same time. This gives $T_{0p}$ directly ($c_1$ is known). As another example, if the energy profile is non-zero across the entire liquid layer, then the pipe wall can be identified from the zero value section of the Doppler energy profile.

Figure 7:
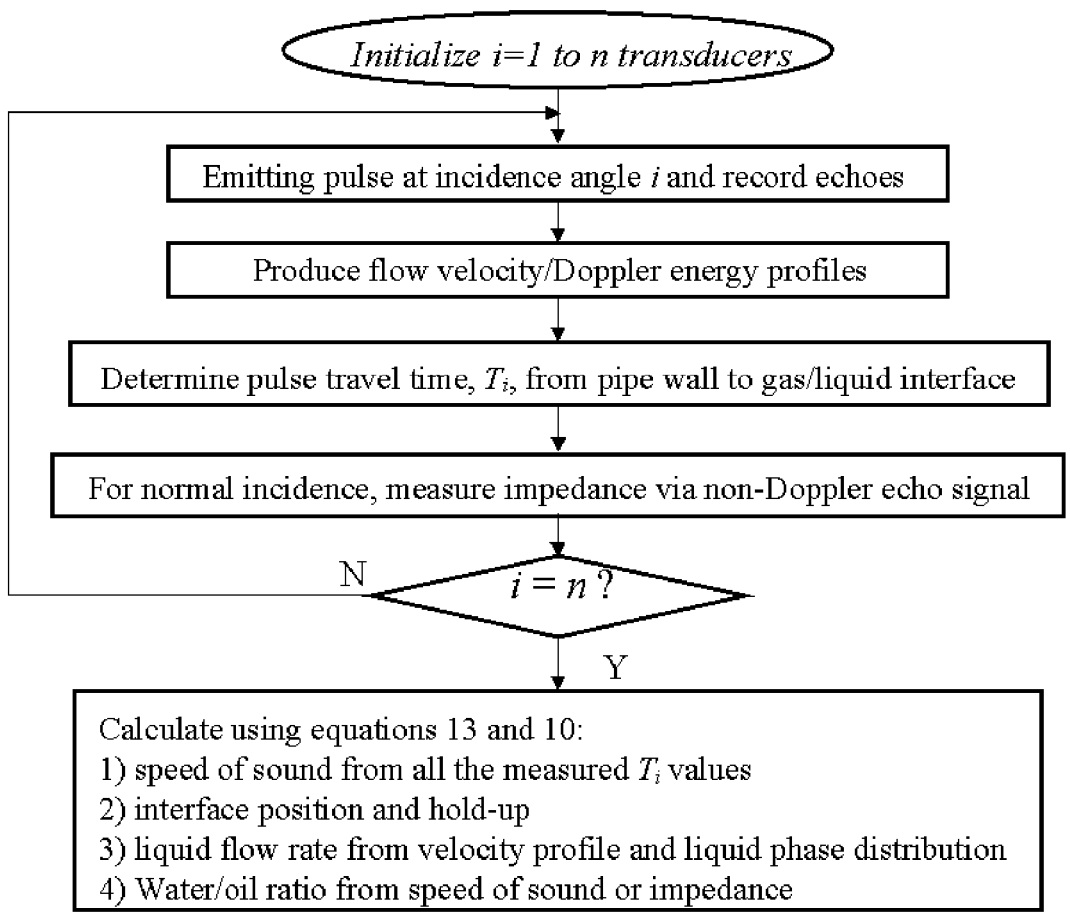
FIG. 7 shows a measurement process flow chart for an ultrasonic measuring device.

The basic measurement process can be summarized with the flow chart shown in FIG. 7.

As a variation to the previously described embodiment, a wide band (high time-resolution pulse) transceiver TR3 may be used to perform a time-domain pulse-echo measurement with a normal incidence angle. TR3 can be used either as a replacement for the narrow band Doppler transceiver, TR2, or as an additional transducer alongside the Doppler transceiver TR2 to provide redundancy of measurements.

Figure 8:
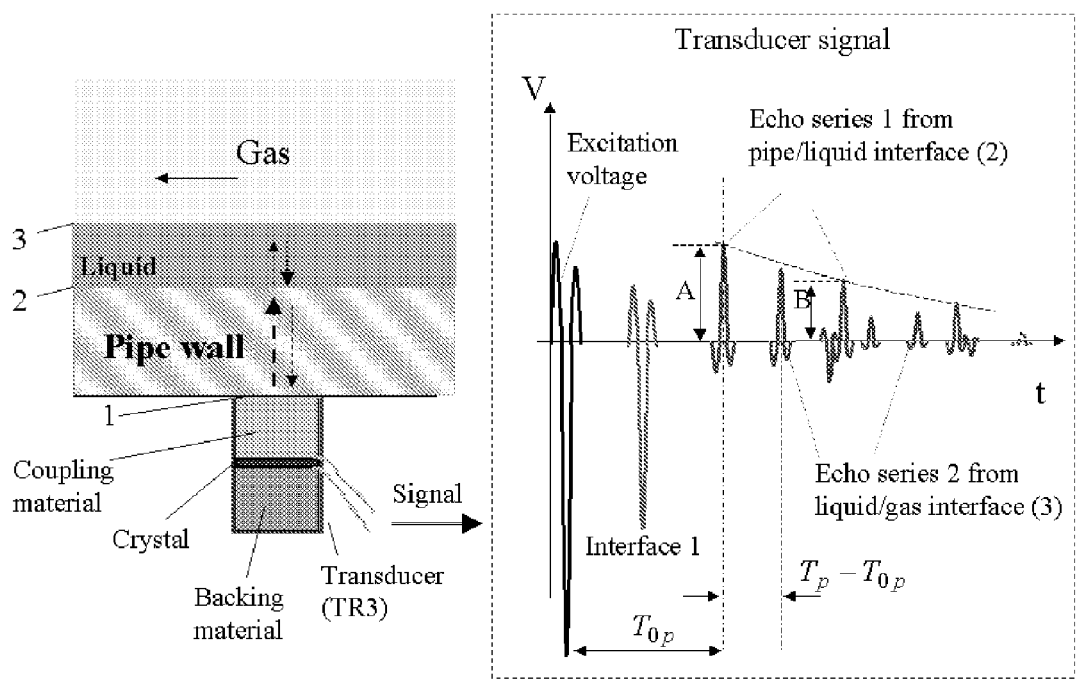
FIG. 8 shows the principle of the time-domain pulse-echo method in which measurements of the acoustic impedance and the interface positions are made.

The basic principle of the pulse-echo based measurement can be explained with the help of FIG. 8. A multi-layered structure is shown on the left side of FIG. 8, consisting of a piezoelectric transducer, which may include a coupling material (known as a delay-line) as a part of it, the pipe wall, a liquid layer and a gas layer inside the pipe. Because the acoustic impedance of each layer differs from those of others, the energy of an ultrasonic pulse propagating (perpendicularly) through the structure gets partially reflected at various interfaces, producing echoes that are received by the transducer. On the left side of FIG. 8, the main interfaces are marked with numbers, with 1 represents the transducer/pipe interface, 2 the pipe/liquid interface and 3 the liquid/gas interface. A wide-band piezoelectric transducer, which can be a commercial one for NDT (non-destructive testing) applications with a typical frequency in the range of 1 to 20 MHz, can be coupled to the pipe wall through a delay-line of suitable material. In a typical measurement cycle, an ultrasonic pulse of short duration (shown in black on the right hand side of FIG. 8) is generated by the transducer, which propagates across the layered structure, producing echo signals at the interfaces. As the initial pulse propagates to the transducer/pipe interface 1, a part of the pulse energy is reflected back towards the transducer, producing an echo (the green pulse). The remaining energy continues to propagate towards the pipe/liquid interface 2. Again, a part of the pulse energy is reflected back towards the transducer, producing another echo (the first blue pulse). The remaining energy reaches interface 3, where almost all the pulse energy gets reflected due to the huge impedance mismatch between gas and liquid. In fact, there are multiple echoes produced by each layer of material. For instance, when the first echo (blue pulse) produced at the interface 2 returns to the transducer, part of its energy is reflected at interface 1, this propagates back to interface 2 again and gets reflected again, producing a reverberation between the two boundaries of the pipe wall. The amplitude reflection coefficient of interface 2 is given by:

$$r_2 = \frac{Z_L - Z_p}{Z_L + Z_p} \qquad \text{Eq. 17}$$

where $Z_L$ is the acoustic impedance of the liquid in contact with the inner pipe wall and $Z_p$ that of the pipe. In equation 17, $Z_p$ is known. If the reflection coefficient, $r_2$, can be measured, then the impedance, $Z_L$, can be determined, i.e.

$$Z_L = Z_p \frac{1 + r^2}{1 - r^2} \qquad \text{Eq. 18}$$

The amplitude reflection coefficient, $r_2$, can be determined by measuring the decay rate of the echo series produced by interface 2. For instance, it can be shown that [10] a simplified expression for $r_2$ is given by:

$$r_2 = \frac{1}{r_1} \cdot \frac{B}{A} \qquad \text{Eq. 19}$$

where $r_1$ is the amplitude reflection coefficient at interface 1, A and B are the echo amplitudes as shown in FIG. 8. Since the impedance of the pipe wall and that of the transducer coupling material are known, $r_1$ is known. Therefore, $r_2$ can be determined according to Eq.19, which can then be used in Eq.18 to determine $Z_L$. Knowing $Z_L$, the fraction of water in the liquid phase, $\alpha_{wlR}$, can be derived. $Z_L$ is given by the product of the density and speed of sound of the mixture, i.e.

$$Z_L = \rho_m \cdot c_L. \qquad \text{Eq. 20}$$

where $\rho_m$ is given by equation 15 and $$c_L = \frac{1}{\sqrt{\rho_m \cdot \left(\frac{\alpha_{wlR}}{Z_w \cdot c_w} + \frac{1 - \alpha_{wlR}}{Z_o \cdot c_o}\right)}} \qquad \text{Eq. 21}$$

is referred to as the Wood equation in Gudmundsson J. S. and Celius H. K, ibid. If one knows the density, $\rho_w$, speed of sound, $c_w$, (and hence the impedance, $Z_w$) for water and those for oil, then with the measured impedance, $Z_L$, one can derive $\alpha_{wlR}$ from a combination of equations 20, 15 and 21.

In addition to the impedance measurement, the pulse-echo method also measures the thickness of the liquid layer. This is done through the echoes produced from interface 3 (shown in red color in FIG. 8), for instance, through measuring the delay time, $T_p-T_{0p}$, between the first blue echo and the first red echo. The thickness is then derived from equation 10, i.e.

$$h_2 = \frac{c_2 \cdot (T_p - T_{0p})}{2}. \quad \text{Eq. 22}$$

As another variation, additional narrow-band transducers, e.g. TR4, TR5 etc. may be added to the basic embodiment to perform additional pulsed Doppler measurements. These transducers have different values for the incidence angle, $\beta_1$, and for the emission frequency, $f_e$, compared to those of TR1. The main idea is to make a robust velocity profile measurement. If the liquid layer is thin and the liquid phase contains only small sized reflectors, then a high frequency (short wave length) transducer, say at 10 MHz, will provide higher measurement resolution and sensitivity than can be provided by a low frequency one, say, at 1 MHz. However, the high frequency transducer needs to have a smaller incidence angle, $\beta_1$, than that used by a low frequency transducer. This is because the flow velocity measurement limit is given by:

$$|V_{max}| = \frac{c_1 \cdot f_{prf}}{4 \sin\beta_1 \cdot f_e}, \quad \text{Eq. 23}$$

where $f_{prf}$ is the pulse repeat frequency of the Doppler measurement, which typically ranges from 100 HZ to 100 kHz.

Figure 9:
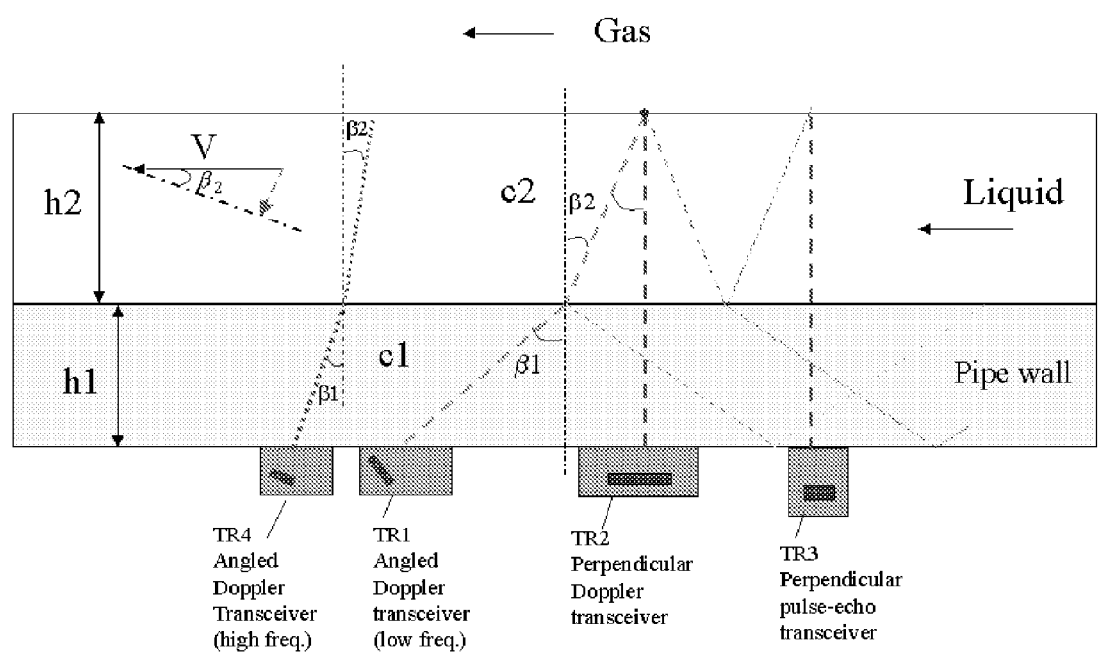
FIG. 9 shows a variant of the ultrasonic measuring device incorporating additional transducers with different incidence angles, frequencies and measurement modes.

An example variation of a basic embodiment including additional transducers is illustrated in FIG. 9. In this system, TR1 and TR4 use different emission frequencies; TR1, TR2 and TR3 may use the same emission frequency, or they may use different frequencies.

The transducers used in the embodiment can be based on conventional piezoelectric crystals, PVDF films, composite arrays, phase-delayed arrays and devices with beam focusing functionalities.

The system disclosed here can be combined with a time-of-flight measurement system based on pitch-catch (system with separate transmitters and receivers) technique to form a more robust integrated system that is applicable to a wider range of flow conditions. For instance, the pitch-catch system works when there are no moving reflectors in the liquid phase to produce detectable Doppler signal.

The invention claimed is:

1. A method for determining a flow rate of a gas-liquid fluid mixture comprising the steps of:
   providing a conduit through which the gas-liquid fluid mixture flows;
   conditioning the fluid mixture in the conduit to separate the liquid in the mixture from the gas;
   flowing the conditioned fluid mixture through a constriction;
   measuring the hold up of the separated liquid;
   measuring the velocity of the separated liquid;
   measuring the velocity of the separated gas; and
   determining the flow rate of the gas-liquid fluid mixture from the hold up and the velocities.

2. A method according to claim 1, wherein, in the conditioning step, the liquid is separated from the gas by swirling the flow in the conduit to form a liquid annulus around a gas core.

3. A method according to claim 2, wherein the hold up is measured by determining the thickness of the liquid annulus.

4. A method according to claim 1, wherein the position of an interface between the separated liquid and the separated gas is determined to measure the hold up.

5. A method according to claim 4, wherein the position of the interface is determined ultrasonically.

6. A method according to claim 1, wherein the velocity of the separated liquid is measured ultrasonically.

7. A method according to claim 1, wherein the dynamic pressure of the separated gas is determined to measure the velocity of the separated gas.

8. A method according to claim 7, wherein the dynamic pressure is determined using a Pitot tube.

9. A method according to claim 1, wherein the fluid mixture comprises natural gas and condensate.

10. An apparatus for providing measurements useable in determining a flow rate of a gas-liquid fluid mixture, the apparatus comprising:
    a conduit through which the gas-liquid fluid mixture can flow, in use the fluid mixture in the conduit being conditioned to separate the liquid in the mixture from the gas;
    a constriction in the conduit configured so that in use the conditioned gas-fluid mixture is flows through the constriction;
    a device for measuring the hold up of the separated liquid;
    a device for measuring the velocity of the separated liquid; and
    a device for measuring the velocity of the separated gas;
    wherein the hold up and the velocities are usable to determine a flow rate of the gas-liquid fluid mixture.

11. An apparatus according to claim 10 further comprising a swirl element for conditioning the fluid by swirling the flow in the conduit to form a liquid annulus around a gas core.

12. An apparatus according to claim 11, wherein the hold up measuring device determines the thickness of the liquid annulus to measure the hold up.

13. An apparatus according to claim 10, wherein the hold up measuring device determines the position of an interface between the separated liquid and the separated gas to measure the hold up.

14. An apparatus according to claim 13, wherein the hold up measuring device determines the position of the interface ultrasonically.

15. An apparatus according to claim 10, wherein the liquid velocity measuring device measures the velocity of the separated liquid ultrasonically.

16. An apparatus according to claim 10, wherein:
    the hold up measuring device determines the position of the interface ultrasonically and the liquid velocity measuring device measures the velocity of the separated liquid ultrasonically; and
    the hold up measuring device and the liquid velocity measuring device are combined in one ultrasonic measuring device.

17. An apparatus according to claim 10, wherein the gas velocity measuring device determines the dynamic pressure of the separated gas to measure the velocity of the separated gas.

18. An apparatus according to claim 17, wherein the gas velocity measuring device includes a Pitot tube device to determine the dynamic pressure.

19. A flow meter for determining a flow rate of a gas-liquid fluid mixture, the flow meter comprising:
  the apparatus of claim 10; and
  a processor arranged to determine the flow rate of the gas-liquid fluid mixture using the hold up and the velocities measured by the apparatus.

20. An oil well pipeline or a gas well pipeline comprising an apparatus according to claim 10.

21. An oil well pipeline or a gas well pipeline comprising a flow meter according to claim 19.

* * * * *